US012749293B2

(12) United States Patent
Ravi et al.

(10) Patent No.: US 12,749,293 B2
(45) Date of Patent: Sep. 29, 2026

(54) MODALITY SPECIFIC LEARNABLE ATTENTION FOR MULTI-CONDITIONED DIFFUSION MODELS

(71) Applicant: ADOBE INC., San Jose, CA (US)

(72) Inventors: Hareesh Ravi, San Jose, CA (US); Aashish Kumar Misraa, Santa Clara, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 104 days.

(21) Appl. No.: 18/817,692

(22) Filed: Aug. 28, 2024

(65) Prior Publication Data

US 2025/0117972 A1 Apr. 10, 2025

Related U.S. Application Data

(60) Provisional application No. 63/588,403, filed on Oct. 6, 2023.

(51) Int. Cl.
*G06T 11/00* (2026.01)
*G06V 10/771* (2022.01)

(52) U.S. Cl.
CPC ............ *G06T 11/00* (2013.01); *G06V 10/771* (2022.01)

(58) Field of Classification Search
CPC ........ G06T 11/00; G06T 11/60; G06V 10/771
USPC .......................................................... 345/581
See application file for complete search history.

(56) References Cited

U.S. PATENT DOCUMENTS 11,922,550 B1 * 3/2024 Ramesh ................ G06F 40/284
12,198,224 B2 * 1/2025 Yuan ........................ G06F 16/53
12,333,636 B2 * 6/2025 Li ........................... G06T 11/60
12,430,829 B2 * 9/2025 Xie .......................... G06T 11/00
12,518,358 B2 * 1/2026 Li .......................... G06F 40/126
12,626,431 B2 * 5/2026 Li ........................... G06T 11/60
2023/0260164 A1 * 8/2023 Yuan .................... G06N 3/0895 382/157
2023/0377214 A1 11/2023 Kansy et al.
2024/0144544 A1 * 5/2024 Liew ........................ G06F 40/40
2024/0161258 A1 5/2024 Maschmeyer et al.
2024/0169622 A1 * 5/2024 Xie .......................... G06T 11/00
2024/0169623 A1 * 5/2024 Zeng ........................ G06T 11/60
2024/0249446 A1 7/2024 Atzmon et al.
2024/0256793 A1 8/2024 Maschmeyer
(Continued)

OTHER PUBLICATIONS

Ronneberger, Olaf, Philipp Fischer, and Thomas Brox, "U-net: Convolutional networks for biomedical image segmentation", International Conference on Medical image computing and computer-assisted intervention. Cham: Springer international publishing, 2015. (Year: 2015), 8 pages.
(Continued)

*Primary Examiner* — Sheree N Brown
(74) *Attorney, Agent, or Firm* — F. CHAU & ASSOCIATES, LLC

(57) ABSTRACT

A method, apparatus, non-transitory computer readable medium, and system for image generation include encoding a text prompt to obtain a text embedding. An image prompt is encoded to obtain an image embedding. Cross-attention is performed on the text embedding and then on the image embedding to obtain a text attention output and an image attention output, respectively. A synthesized image is generated based on the text attention output and the image attention output.

19 Claims, 14 Drawing Sheets

(56) References Cited

U.S. PATENT DOCUMENTS

| | | | | |
|---|---|---|---|---|
| 2024/0281924 | A1* | 8/2024 | Park | G06T 3/4046 |
| 2024/0282016 | A1 | 8/2024 | Liu et al. | |
| 2024/0296607 | A1* | 9/2024 | Li | G06T 11/60 |
| 2024/0311693 | A1 | 9/2024 | Smith et al. | |
| 2024/0320867 | A1 | 9/2024 | Bean | |
| 2024/0330381 | A1 | 10/2024 | Sadr | |
| 2024/0331236 | A1* | 10/2024 | Li | G06T 11/60 |
| 2024/0338799 | A1* | 10/2024 | Li | G06F 40/126 |
| 2024/0386249 | A1 | 11/2024 | Harvey et al. | |
| 2024/0420407 | A1 | 12/2024 | Ntavelis et al. | |
| 2025/0022258 | A1 | 1/2025 | Li et al. | |
| 2025/0037323 | A1 | 1/2025 | Srinivasan et al. | |
| 2025/0054322 | A1 | 2/2025 | Ye et al. | |
| 2025/0078392 | A1* | 3/2025 | Shi | G06T 15/205 |
| 2025/0094484 | A1* | 3/2025 | Zheng | G06V 10/44 |
| 2025/0111655 | A1 | 4/2025 | Povalyaev et al. | |
| 2026/0094327 | A1* | 4/2026 | Cohen | G06F 16/783 |

OTHER PUBLICATIONS

Office Action dated Nov. 7, 2025 in related U.S. Appl. No. 18/637,654.

Balaji, et al., eDiff-i: Text-to-Image Diffusion Models with an Ensemble of Expert Denoisers, arXiv preprint arXiv:2211.01324v5 [cs.CV] Mar. 14, 2023, 24 pages.

Ramesh, et al., "Hierarchical Text-Conditional Image Generation with CLIP Latents", arXiv preprint arXiv:2204.06125v1 [cs.CV] Apr. 13, 2022, 27 pages.

* cited by examiner

MODALITY SPECIFIC LEARNABLE ATTENTION FOR MULTI-CONDITIONED DIFFUSION MODELS

CROSS-REFERENCE TO RELATED APPLICATION

This application claims benefit under 35 U.S.C. § 119 to U.S. Provisional Application No. 63/588,403, filed on Oct. 6, 2023, in the United States Patent and Trademark Office, the disclosure of which is incorporated by reference herein in its entirety.

BACKGROUND

The following relates generally to image processing, and more specifically to image generation using machine learning. Image processing refers to the use of a computer to edit a digital image using an algorithm or a processing network. Recently, machine learning models have been used in advanced image processing techniques. Among these machine learning models, diffusion models and other generative models such as generative adversarial networks (GANs) have been used for various tasks including generating images with perceptual metrics, generating images in conditional settings, image inpainting, and image manipulation.

Image generation, a subfield of image processing, involves the use of diffusion models to synthesize images. Diffusion models can be used for various image generation tasks including image super-resolution, generation of images with perceptual metrics, conditional generation (e.g., generation based on text guidance), image inpainting, and image manipulation. Specifically, diffusion models are trained to take random noise as input and generate unseen images with features similar to the training data.

SUMMARY

The present disclosure describes systems and methods for image processing. Embodiments of the present disclosure include an image generation apparatus that generates a synthesized image based on a text prompt and an image prompt. The image generation apparatus encodes the text prompt and the image prompt to obtain a text embedding and an image embedding, respectively. In some examples, the text embedding comprises a first set of tokens in a text embedding space and the image embedding comprises a second set of tokens in the text embedding space. The image generation apparatus performs, using a text attention layer of an image generation model, cross-attention on the text embedding to obtain a text attention output. The image generation apparatus performs, using an image attention layer of the image generation model, cross-attention on the image embedding to obtain an image attention output. The synthesized image is generated based on the text attention output and the image attention output.

A method, apparatus, and non-transitory computer readable medium for image generation are described. One or more embodiments of the method, apparatus, and non-transitory computer readable medium include encoding a text prompt to obtain a text embedding; encoding an image prompt to obtain an image embedding; performing, using a text attention layer of an image generation model, cross-attention on the text embedding to obtain a text attention output; performing, using an image attention layer of the image generation model, cross-attention on the image embedding to obtain an image attention output; and generating, using a generator network of the image generation model, a synthesized image based on the text attention output and the image attention output.

A method, apparatus, and non-transitory computer readable medium for training a machine learning model for image generation are described. One or more embodiments of the method, apparatus, and non-transitory computer readable medium include obtaining a training set including a training text prompt and a training image prompt; and training, using the training set, an image generation model to generate a synthesized image, the training comprising training a text attention layer of the image generation model to perform cross-attention based on the training text prompt and training an image attention layer of the image generation model to perform cross-attention based on the training image prompt.

An apparatus and method for image generation are described. One or more embodiments of the apparatus and method include at least one processor; at least one memory including instructions executable by the at least one processor; and an image generation model comprising parameters in the at least one memory, wherein the image generation model includes a text attention layer that performs cross-attention based on a text prompt and an image attention layer that performs cross-attention based on an image prompt, and wherein the image generation model is trained to generate a synthesized image.

DETAILED DESCRIPTION

Figure 1:
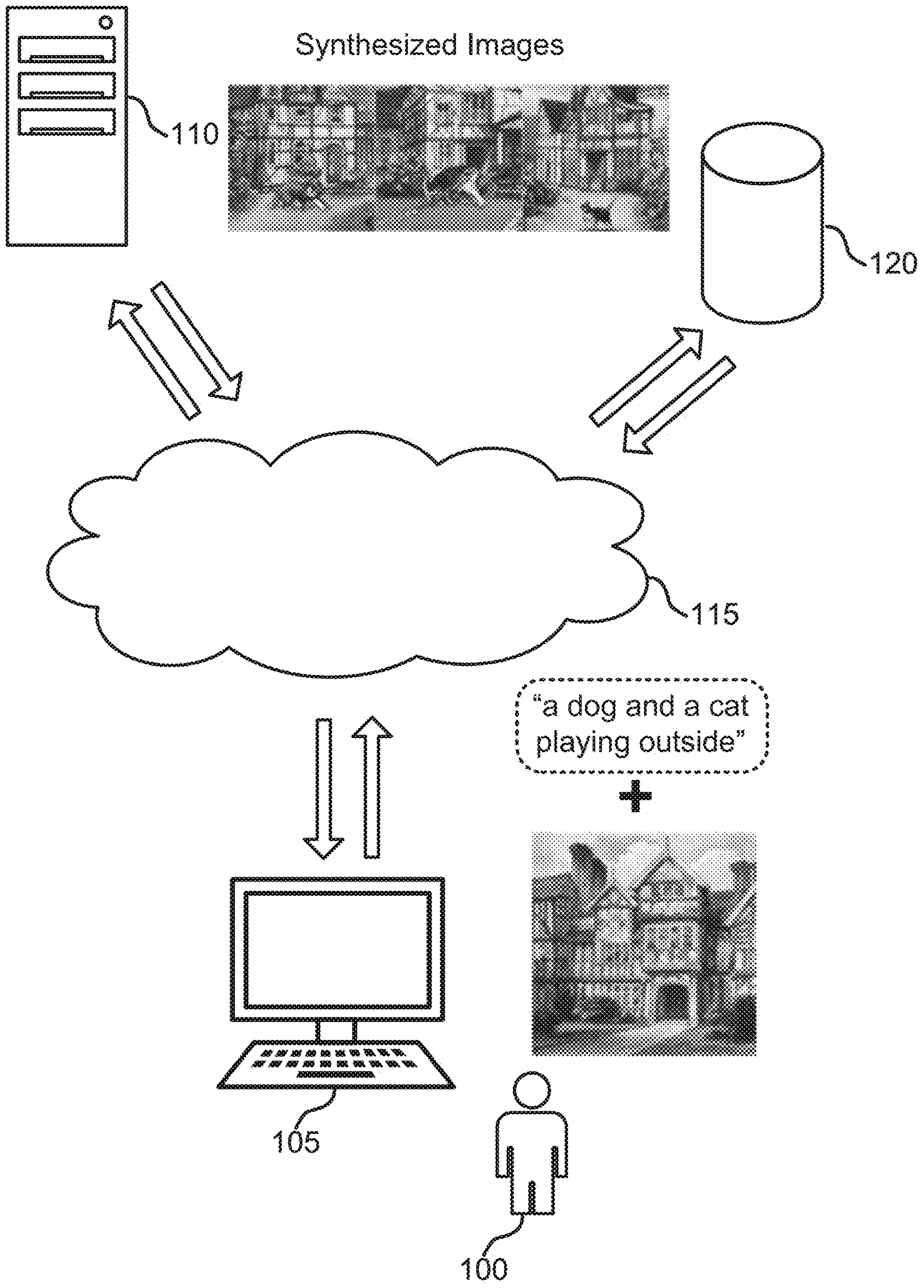
FIG. 1 shows an example of an image generation system according to aspects of the present disclosure.

The present disclosure describes systems and methods for image processing. Embodiments of the present disclosure include an image generation apparatus that generates a synthesized image based on a text prompt and an image prompt. The image generation apparatus encodes the text prompt and the image prompt to obtain a text embedding and an image embedding, respectively. In some examples, the text embedding comprises a first set of tokens in a text embedding space and the image embedding comprises a second set of tokens in the text embedding space. The image generation apparatus performs, using a text attention layer of an image generation model, cross-attention on the text embedding to obtain a text attention output. The image generation apparatus performs, using an image attention layer of the image generation model, cross-attention on the image embedding to obtain an image attention output. The synthesized image is generated based on the text attention output and the image attention output.

Diffusion models are a class of generative neural networks that can be trained to generate new data with features similar to features found in training data. Diffusion models can be used in image synthesis, image completion tasks, etc. In some examples, diffusion models take text information (e.g., a text prompt) as a condition for image generation tasks and are trained to generate images that are consistent with the elements specified in the text prompt.

Recently, image generation models may use both text and images for training. For example, text embeddings and image embeddings can be used in training diffusion models. Conventional models concatenate an image embedding to a text embedding to produce a joint conditioning embedding for training the models. In some examples, these models append a CLIP image embedding to text tokens (e.g., T5-xx1 128 tokens, CLIP text 77 tokens and then CLIP image 1 token) as a single long sequence of embeddings. In addition, conventional models are limited to a single set of cross-attention layers to perform cross-attention.

Embodiments of the present disclosure include an image generation apparatus configured to obtain a text prompt and an image prompt and then generate a synthesized image based on the text prompt and the image prompt. By separating the cross-attention pathways, the more informative image prompt can be weighted higher than text. The image generation apparatus treats text and image separately. The image prompt is associated with its own learnable projection layers. An image generation model can attend to both text and image and then the union of what the image generation model learns is used for subsequent step(s). Due to the unique modality specific learnable attention implementation, more weights can be assigned to images during training (e.g., 30% of the training data are images) without image dominating. In some cases, the image attention output is weighted higher than the text attention output in the generator network.

In some embodiments, the image generation model encodes the text prompt and the image prompt to obtain a text embedding and an image embedding, respectively. The image generation model performs, using a text attention layer of the image generation model, cross-attention on the text embedding to obtain a text attention output. The image generation model performs, using an image attention layer of the image generation model, cross-attention on the image embedding to obtain an image attention output. A generator network of the image generation model generates a synthesized image based on the text attention output and the image attention output.

One or more embodiments provide text-to-image generation that is guided by a reference image (e.g., an image prompt) and a text prompt. The image generation apparatus involves using separate learnable cross-attention layers for text embedding and image embedding. For example, a text attention layer performs cross-attention on the text embedding and an input image. An image attention layer performs cross-attention on the image embedding and the input image. The cross-attention outputs are then combined as input to a diffusion model. In some examples, an image embedding of a reference image is separately encoded using a combination of an image encoder and a learnable image projector.

The present disclosure describes systems and methods that improve on conventional image generation models by providing more accurate depiction of image-related attributes in synthesized images. For example, generated images can include attributes and elements depicted in a reference image. That is, users can achieve more precise control over information represented in an image embedding of the reference image compared to conventional generative models. Embodiments achieve this improved accuracy and control by having separate learnable cross-attention layers for text embedding and image embedding and the model processes the text embedding and the image embedding in parallel (i.e., different from concatenating different types of embeddings into a single long sequence of embeddings). In some cases, the text attention output and the image attention output are generated in separate pathways.

In some examples, an image generation apparatus based on the present disclosure obtains a text prompt and an image prompt (e.g., a digital image), and generates a synthesized image based on the text prompt and the image prompt. Examples of application in the text-to-image generation context are provided with reference to FIGS. 2-6. Details regarding the architecture of an example system and network architecture are provided with reference to FIGS. 1 and 8-12. Details regarding the image generation process are provided with reference to FIG. 7.

Text-to-Image Generation

FIG. 1 shows an example of an image generation system according to aspects of the present disclosure. The example shown includes user 100, user device 105, image generation apparatus 110, cloud 115, and database 120. Image generation apparatus 110 is an example of, or includes aspects of, the corresponding element described with reference to FIG. 8.

In an example shown in FIG. 1, an image prompt is provided by user 100 and transmitted to image generation apparatus 110, e.g., via user device 105 and cloud 115. In some cases, the image prompt is retrieved via cloud 115, from database 120 (e.g., an image database). A query is provided by user 100 and transmitted to image generation apparatus 110, e.g., via user device 105 and cloud 115. The query is a text prompt received from user 100. For example, the text prompt is "a dog and a cat playing outside".

In some examples, image generation apparatus 110 encodes the text prompt to obtain a text embedding and encodes the image prompt to obtain an image embedding. Image generation apparatus 110 performs, using a text attention layer of an image generation model, cross-attention on the text embedding to obtain a text attention output. Image generation apparatus 110 performs, using an image attention layer of the image generation model, cross-attention on the image embedding to obtain an image attention output. Image generation apparatus 110 generates, using a generator network of the image generation model, a synthesized image based on the text attention output and the image attention output. For example, the synthesized image includes one or more elements from the text prompt. The synthesized image includes a dog and a cat playing outside a building. Image generation apparatus 110 returns the synthesized image to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application (e.g., an image generator, an image editing tool). In some examples, the image processing application on user device 105 may include functions of image generation apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Image generation apparatus 110 includes a computer implemented network comprising a text encoder, an image encoder, an image projector, a text attention layer, an image attention layer, and a generator network. Image generation apparatus 110 may also include a processor unit, a memory unit, an I/O module, a user interface, and a training component. The training component is used to train a machine learning model (or an image generation model). Additionally, image generation apparatus 110 can communicate with database 120 via cloud 115. In some cases, the architecture of the image generation network is also referred to as a network, a machine learning model, or a network model. Further detail regarding the architecture of image generation apparatus 110 is provided with reference to FIGS. 8-12. Further detail regarding the operation of image generation apparatus 110 is provided with reference to FIGS. 2 and 7.

In some cases, image generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data (e.g., candidate text style images, candidate text content images, a training set including one or more ground-truth images) in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
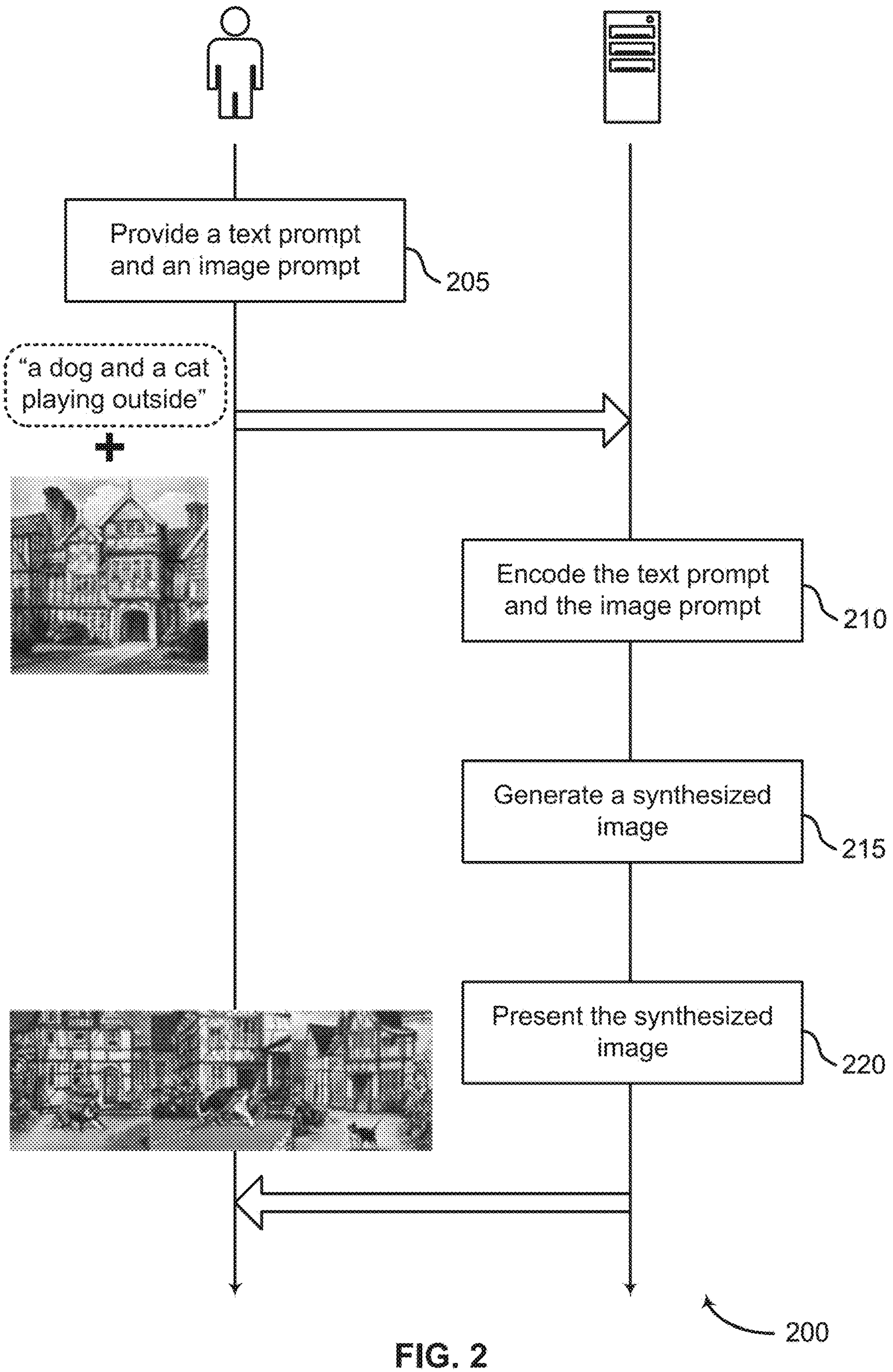
FIG. 2 shows an example of a method for image generation according to aspects of the present disclosure.

FIG. 2 shows an example of a method 200 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a text prompt and an image prompt. In some cases, the operations of this step refer to, or may be performed by, a user as described with reference to FIG. 1. For example, the image prompt can be a reference image such as an image that depicts a background scene. The text prompt can be a sentence or phrase that describes an additional element (e.g., a foreground element) to be added to the scene.

At operation 210, the system encodes the text prompt and the image prompt. In some cases, the operations of this step refer to, or may be performed by, an image generation apparatus as described with reference to FIGS. 1 and 8.

At operation 215, the system generates a synthesized image based on the text prompt encoding and the image prompt encoding. In some cases, the operations of this step refer to, or may be performed by, an image generation apparatus as described with reference to FIGS. 1 and 8.

At operation 220, the system presents the synthesized image to the user. In some cases, the operations of this step refer to, or may be performed by, an image generation apparatus as described with reference to FIGS. 1 and 8.

Figure 3:
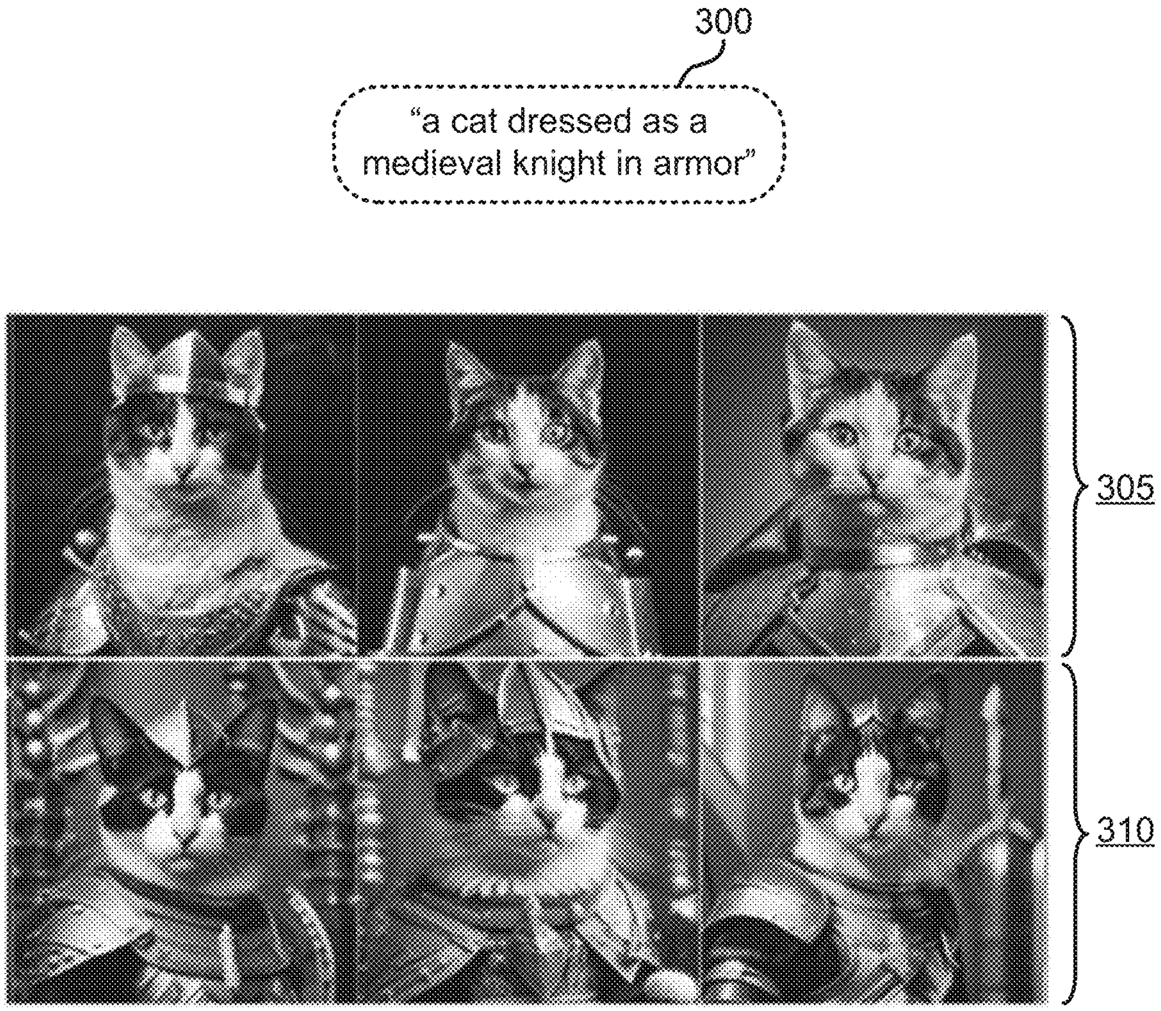
FIGS. 3 through 6 show examples of synthesized images according to aspects of the present disclosure.

FIG. 3 shows an example of synthesized images according to aspects of the present disclosure. The example shown includes text prompt 300, first set of synthesized images 305, and second set of synthesized images 310. In an embodiment, image generation model 825 (described with reference to FIG. 8) generates the second set of synthesized images 310. An example of text prompt 300 is "a cat dressed as a medieval knight in armor". The second set of synthesized images 310 depict a cat dressed in armor looking like a knight.

In the first row, a first image generation model does not use the separate cross attention methods as described with reference to FIGS. 9-10 at training or inference time. The first image generation model does not take an image embedding corresponding to an image as input to condition the model during training. The first set of synthesized images 305, generated using the first image generation model, look simplistic, and lack of background details and diversity.

Figure 9:
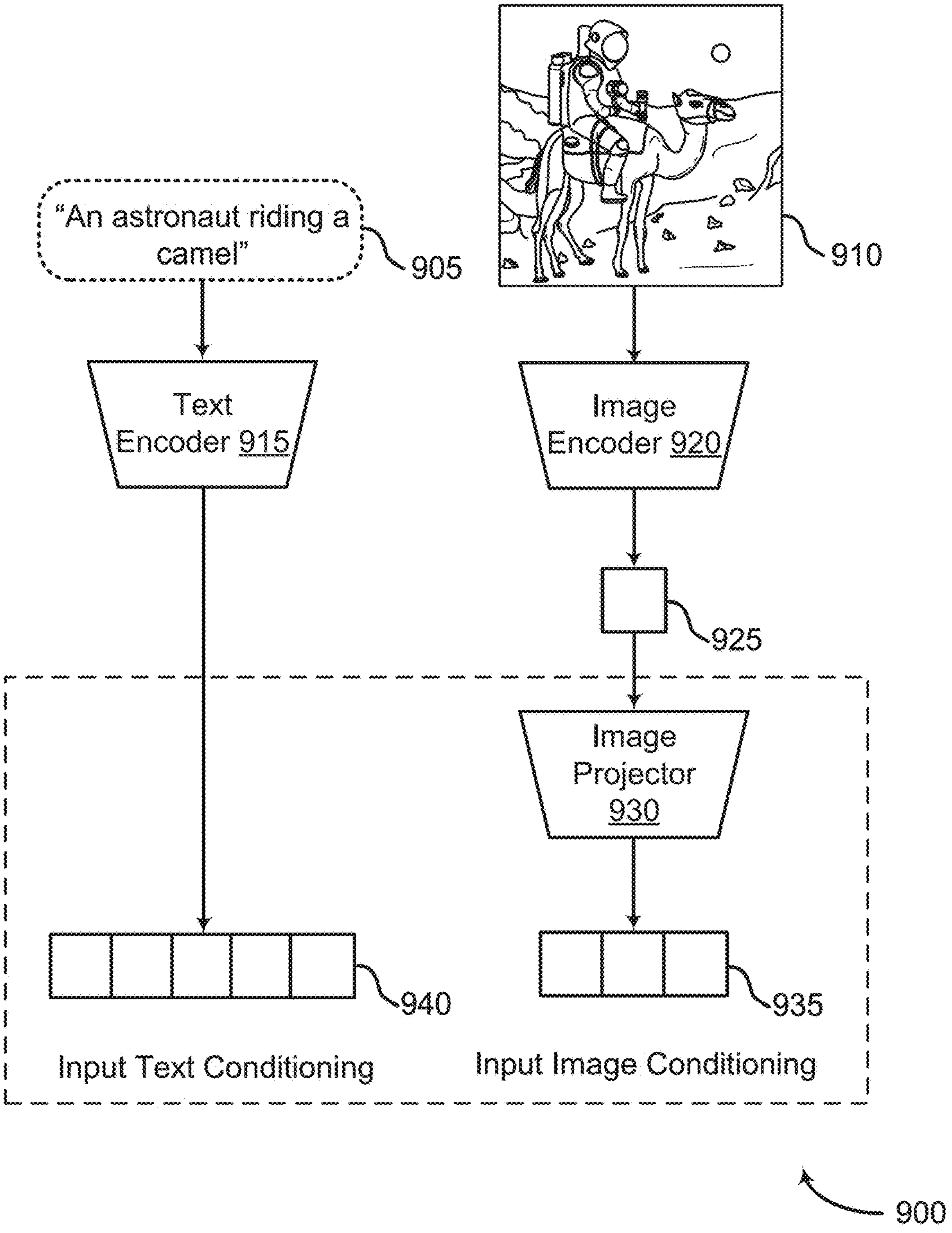
FIGS. 9 and 10 show examples of an image generation model according to aspects of the present disclosure.
Figure 10:
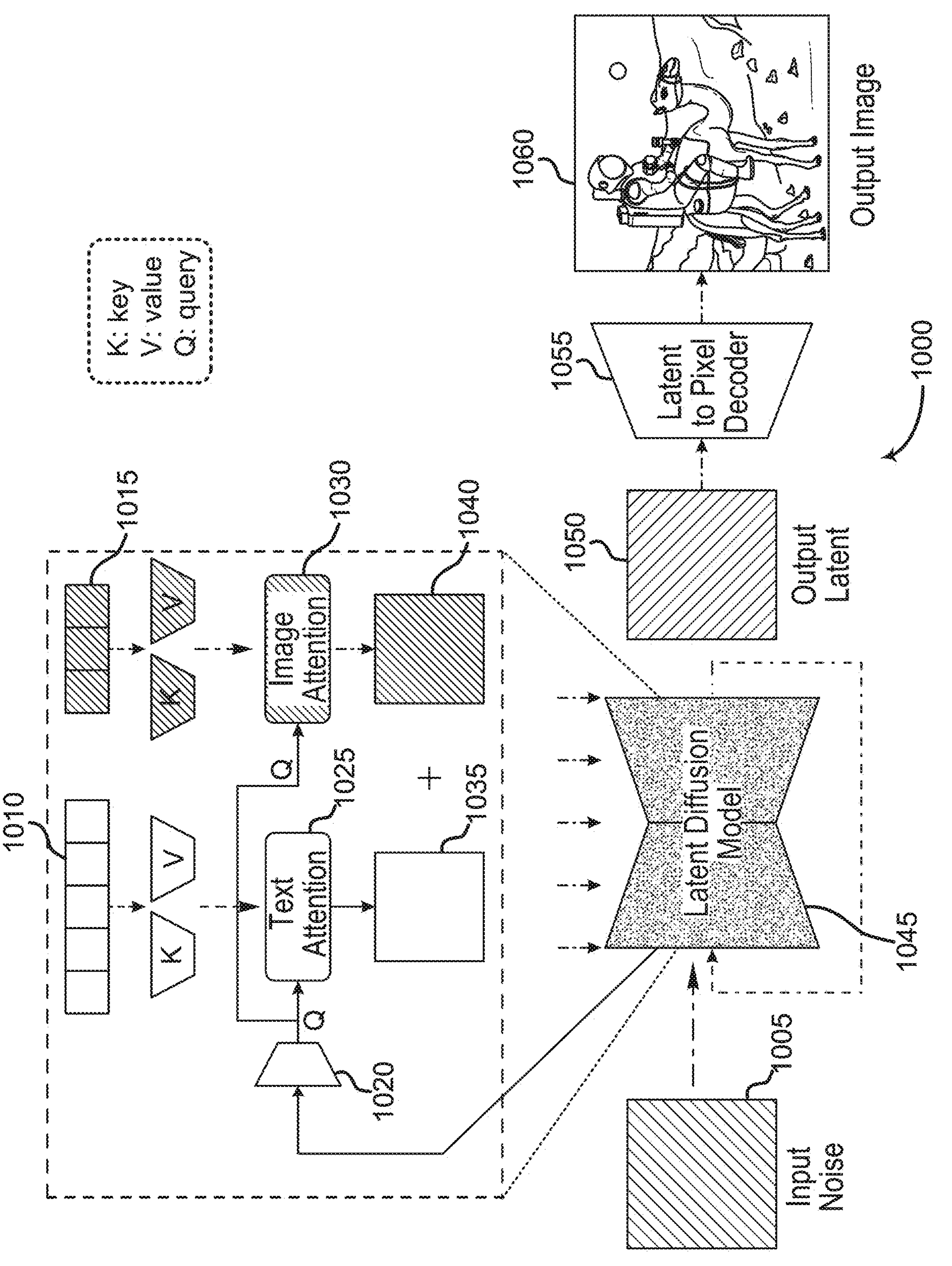

In the second row, a second image generation model (e.g., image generation model 825) uses the separate cross attention methods as described in FIGS. 9-10 during training. The second image generation model takes an image embedding corresponding to an image as input to condition the model during training. At inference time, the second image generation model takes a text embedding corresponding to a text prompt as condition applied to the model. The second set of synthesized images 310 look more complicated compared to the first set of synthesized images 305. The second set of synthesized images 310 include more background details and show increased image/object diversity. In some cases, an image embedding of an image is optional at inference time. The second image generation model can obtain improved image generation quality and hallucination compared to the first image generation model.

Figure 4:
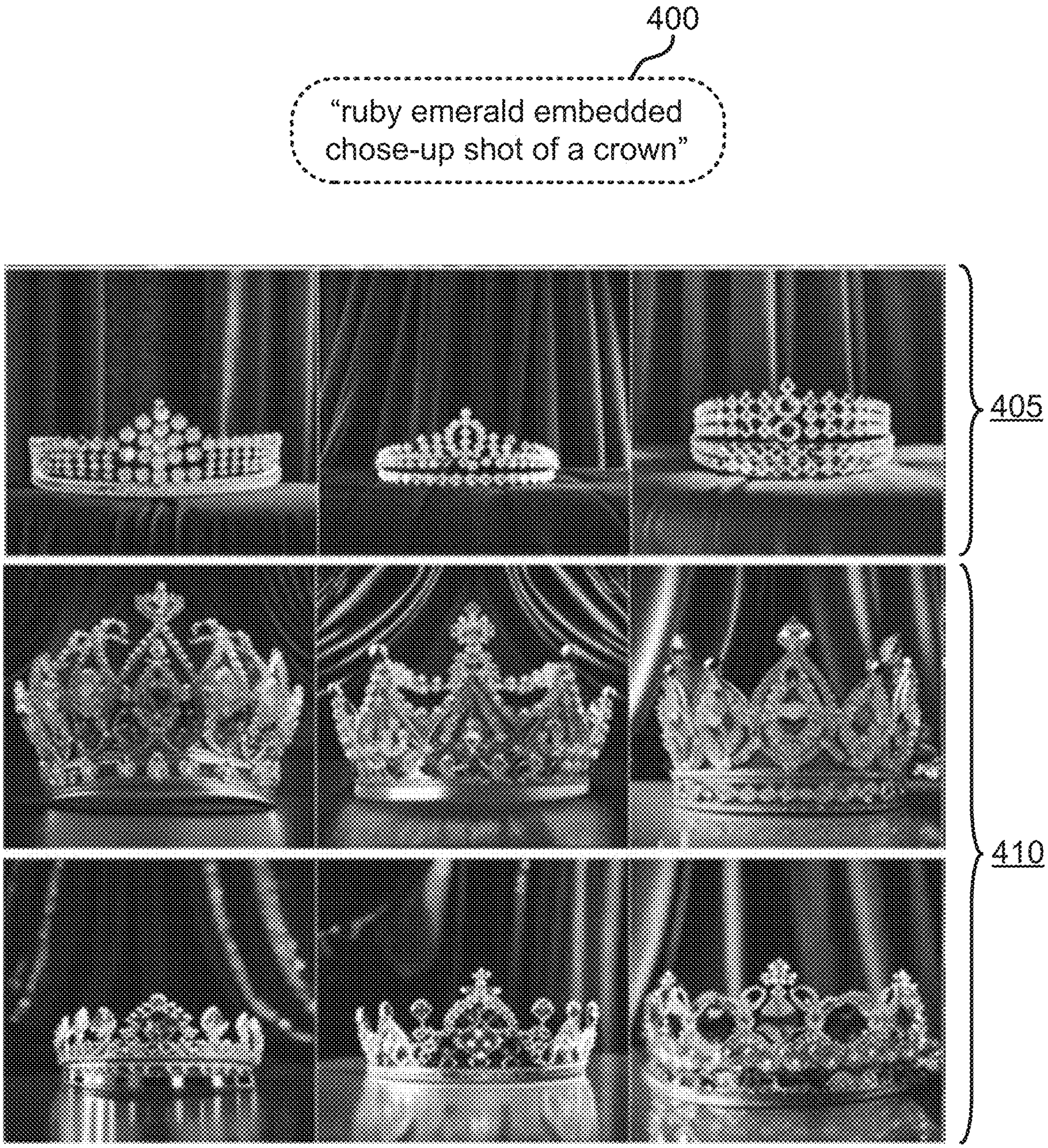

FIG. 4 shows an example of synthesized images according to aspects of the present disclosure. The example shown includes text prompt 400, first set of synthesized images 405, and second set of synthesized images 410. In an embodiment, image generation model 825 (as described with reference to FIG. 8) generates the second set of synthesized images 410. An example of a text prompt 400 is "ruby emerald embedded chose-up shot of a crown". The second set of synthesized images 410, generating using image generation model 825, depict a crown including jewelry such as ruby and emerald.

In the first row, a first image generation model does not use the separate cross attention methods as described in FIGS. 9-10 at training or inference time. The first image generation model does not take an image embedding corresponding to an image as input to condition the model during training. The first set of synthesized images 405, generated using the first image generation model, look simplistic, and lack of background details and diversity.

In the second row and third row, a second image generation model (e.g., image generation model 825) uses the separate cross attention methods as described in FIGS. 9-10 during training. The second image generation model takes an image embedding corresponding to an image as input to condition the model during training. At inference time, the second image generation model takes a text embedding corresponding to the text prompt as condition applied to the model. The second set of synthesized images 410 look more complicated compared to the first set of synthesized images 405. The second set of synthesized images 410 include more background details and variations (e.g., background of the synthesized images may have different colors, and/or different sizes compared to a foreground object). The second set of synthesized images 410 show increased image/object/background diversity. In some cases, an image embedding of an image is optional at inference time. The second image generation model can obtain improved image generation quality and hallucination compared to the first image generation model.

Figure 5:
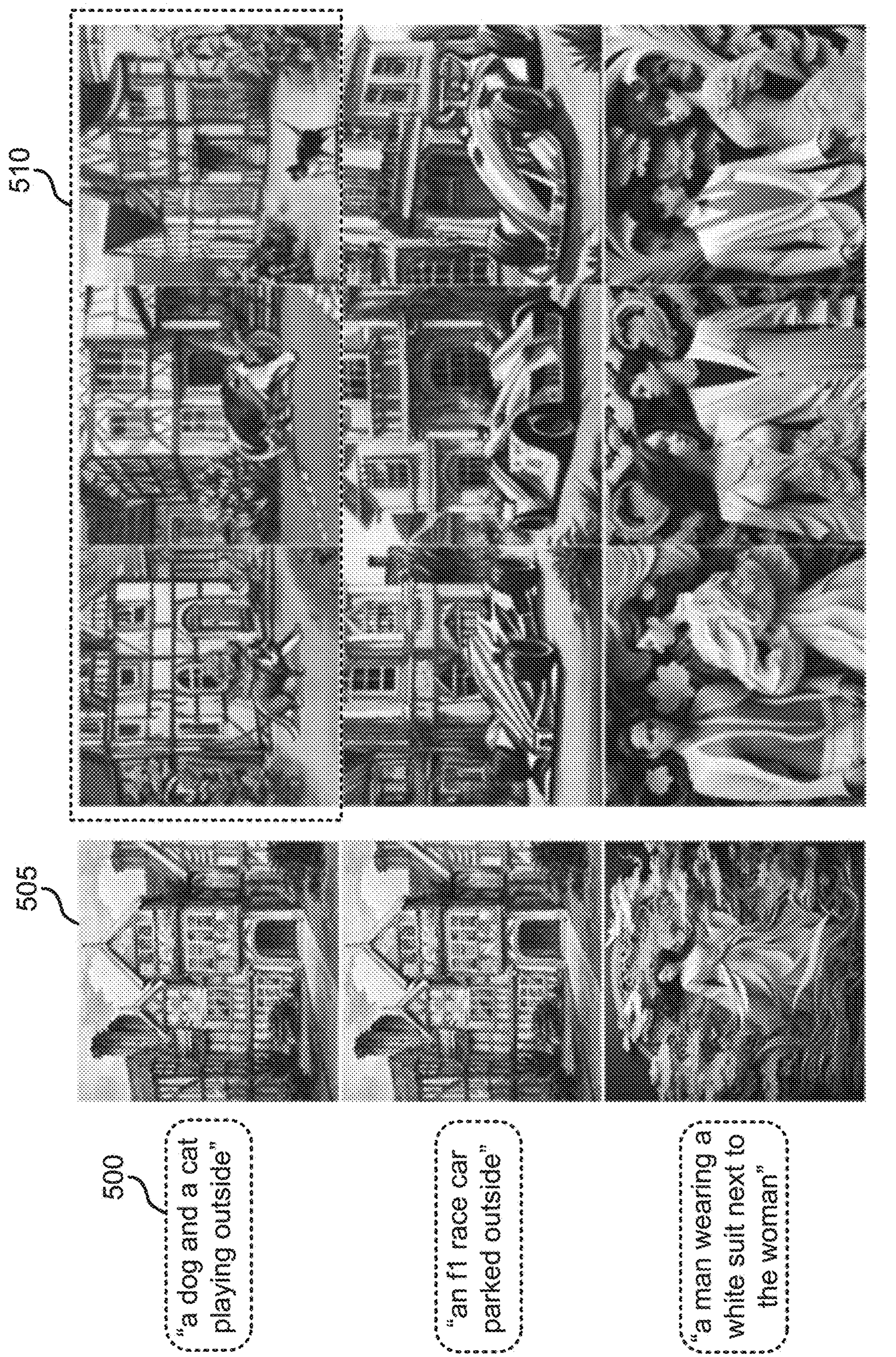

FIG. 5 shows an example of synthesized images 510 according to aspects of the present disclosure. The example shown includes text prompt 500, image prompt 505, and synthesized images 510.

Image generation model 825 (see FIG. 8) generates a set of synthesized images 510. For example, in the first row, text prompt 500 is "a dog and a cat playing outside". The first image in the first row is image prompt 505. The rest three images in the first row of synthesized images 510 depict a dog and a cat playing outside combined with a context element shown in the image prompt 505.

In the second row, a text prompt is "an f1 race car parked outside". The first image in the second row is an image prompt. The rest four images in the second row of synthesized images depict an f1 race car parked outside combined with a context element shown in the image prompt.

In the third row, a text prompt is "a man wearing a white suit next to the woman". The first image in the third row is an image prompt. The rest four images in the third row of synthesized images depict a man wearing a white suit next to the woman combined with a context element shown in the image prompt.

Text prompt 500 is an example of, or includes aspects of, the corresponding element described with reference to FIGS. 6 and 9. Image prompt 505 is an example of, or includes aspects of, the corresponding element described with reference to FIGS. 6 and 9. Synthesized images 510 is an example of, or includes aspects of, the corresponding element described with reference to FIGS. 3, 4, and 6.

Figure 6:
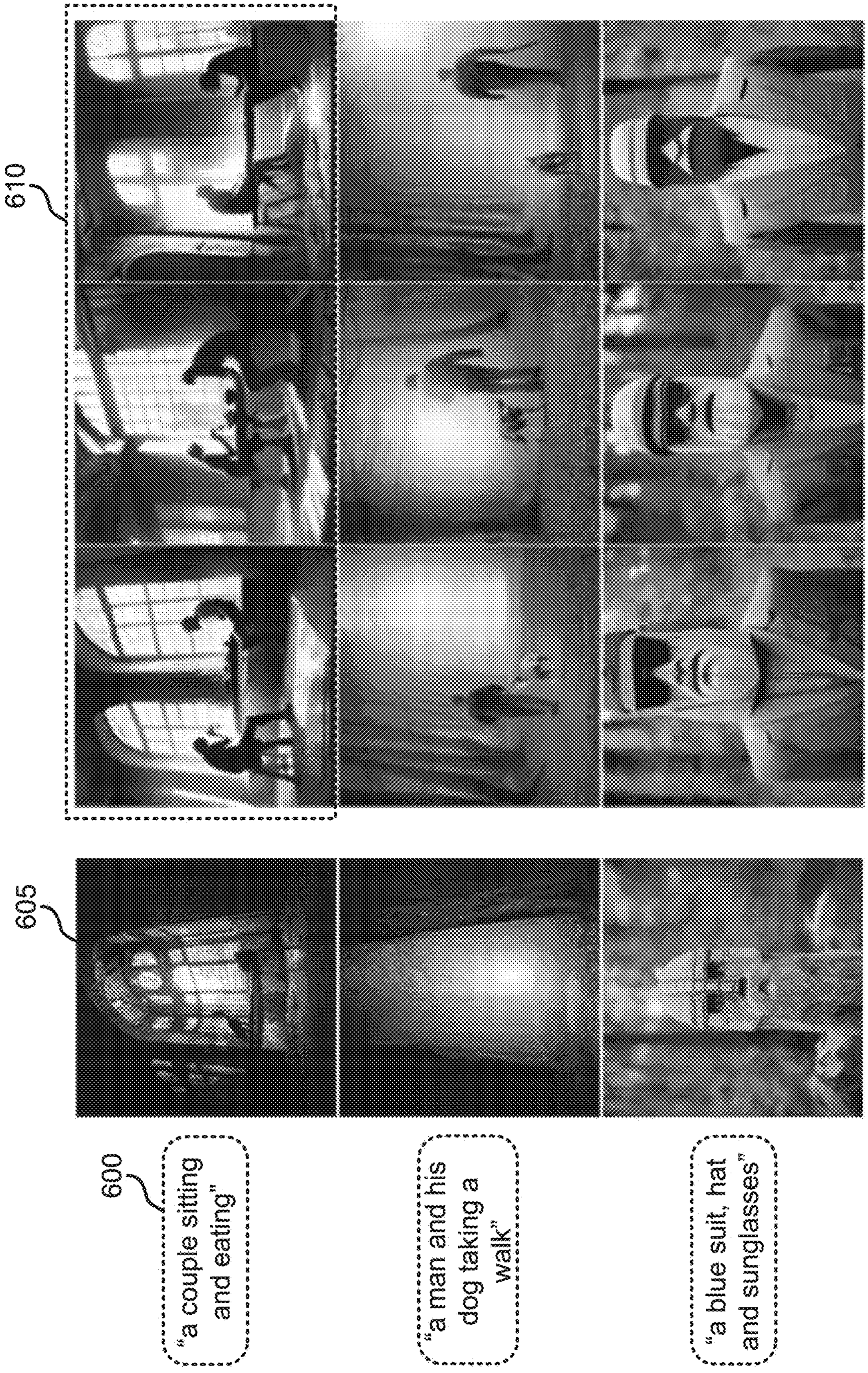

FIG. 6 shows an example of synthesized images 610 according to aspects of the present disclosure. The example shown includes text prompt 600, image prompt 605, and synthesized images 610.

Image generation model 825 (see FIG. 8) generates a set of synthesized images 610. For example, in the first row, text prompt 600 is "a couple sitting and eating". The first image in the first row is image prompt 605. The rest four images in the first row of synthesized images 610 depict a couple sitting and eating combined with a context element shown in the image prompt 605.

In the second row, a text prompt is "a man and his dog taking a walk". The first image in the second row is an image prompt. The rest four images in the second row of synthesized images depict a man and his dog taking a walk combined with a context element shown in the image prompt.

In the third row, a text prompt is "a blue suit, hat and sunglasses". The first image in the third row is an image prompt. The rest four images in the third row of synthesized images depict a blue suit, hat and sunglasses combined with a context element shown in the image prompt.

Text prompt 600 is an example of, or includes aspects of, the corresponding element described with reference to FIGS. 5 and 9. Image prompt 605 is an example of, or includes aspects of, the corresponding element described with reference to FIGS. 5 and 9. Synthesized images 610 is an example of, or includes aspects of, the corresponding element described with reference to FIGS. 3-5.

Figure 7:
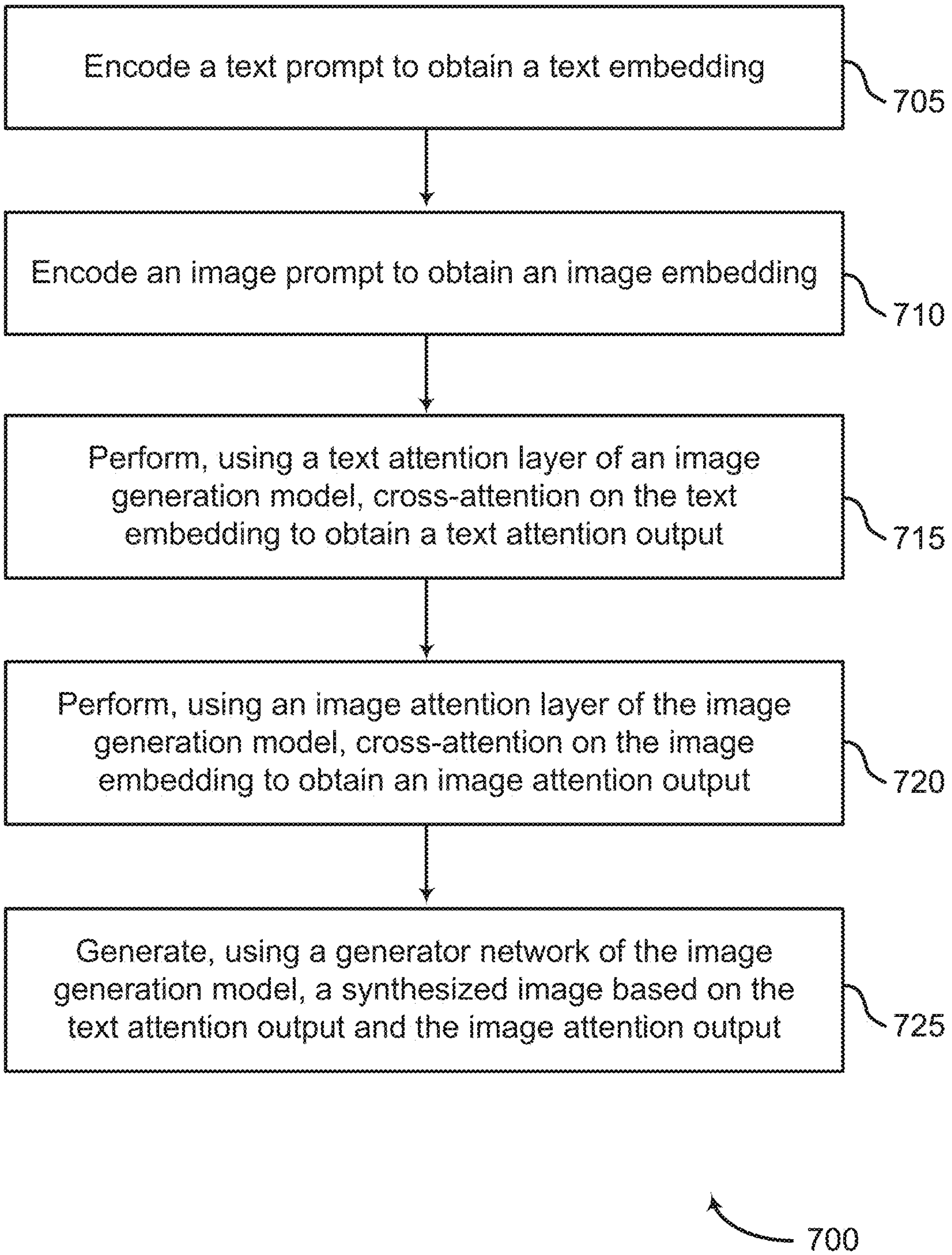
FIG. 7 shows an example of a method for image generation according to aspects of the present disclosure.

FIG. 7 shows an example of a method 700 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system encodes a text prompt to obtain a text embedding. In some cases, the operations of this step refer to, or may be performed by, a text encoder as described with reference to FIGS. 8 and 9.

In some examples, a text prompt in the context of text-to-image generation refers to an input text fed to a machine learning model to generate or complete text, create images, or perform other tasks. A text prompt may serve as the starting point or guidance for the model to produce an output that aligns with a user's intent. Text prompts are used in language models such as GPT and text-to-image generation models. In some cases, a text prompt includes a question, a statement, an incomplete sentence, or a detailed description depending on the desired outcome.

In some cases, a text prompt is received from a user via a user interface. For example, a text prompt is "a dog and a cat playing outside". The text prompt contains elements "dog" and "cat" and a relationship between a first element and a second element (e.g., "playing"). Additionally, the text prompt depicts the relationship between an element and an object in a target image (e.g., "outside").

In some cases, text embedding is also known as a word embedding. The term "word embedding" refers to a learned representation for text where words that have the same meaning have a similar representation. Glove and Word2vec are examples of systems for obtaining a vector representation of words. GloVe is an unsupervised algorithm for training a network using aggregated global word-word co-occurrence statistics from a corpus. Similarly, a Word2vec model may include a shallow neural network trained to reconstruct the linguistic context of words. GloVe and Word2vec models may take a large corpus of text and produce a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in addition to semantic information for individual words.

At operation 710, the system encodes an image prompt to obtain an image embedding. In some cases, the operations of this step refer to, or may be performed by, an image encoder as described with reference to FIGS. 8 and 9. In some examples, an image prompt refers to an image provided to a machine learning model, typically in a digital image format, to guide the generation of a synthetic image that matches or resembles certain attributes, styles, or elements from the image prompt. Image prompts are used in text-to-image generation models.

In an embodiment, the image prompt includes an image received from a user. An image encoder is configured to encode the image prompt to obtain a preliminary image encoding. An image projector is configured to project the preliminary image encoding to obtain the image embedding.

In some examples, the text embedding includes a first set of tokens in a text embedding space and the image embedding comprises a second set of tokens in the text embedding space. The text embedding includes a same number of tokens as the image embedding.

At operation 715, the system performs, using a text attention layer of an image generation model, cross-attention on the text embedding to obtain a text attention output. In some cases, the operations of this step refer to, or may be performed by, an image generation model as described with reference to FIGS. 8-10.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values. In the context of an attention network, the key and value are typically vectors or matrices that are used to represent the input data. The key is used to determine which parts of the input the attention mechanism should focus on, while the value is used to represent the actual data being processed.

At operation 720, the system performs, using an image attention layer of the image generation model, cross-attention on the image embedding to obtain an image attention output. In some cases, the operations of this step refer to, or may be performed by, an image generation model as described with reference to FIGS. 8-10.

The term "cross-attention" refers to an attention mechanism in Transformer architecture that mixes two different embedding sequences. The two sequences must have the same dimension. The two sequences can be of different modalities (e.g. text, image, sound). In some examples, one of the sequences defines the output length as it plays a role of a query input while the other sequence then produces key and value input. Cross-attention can be used in applications such as image-text classification, machine translation (e.g., cross-attention helps decoder predict next token of the translated text. Cross-attention combines asymmetrically two separate embedding sequences of same dimension, in contrast self-attention input is a single embedding sequence. One of the sequences serves as a query input, while the other as a key and value inputs.

Cross-attention is different from self-attention. The term "self-attention" refers to a machine learning model in which representations of the input interact with each other to determine attention weights for the input. Self-attention can be distinguished from other attention models because the attention weights are determined at least in part by the input itself.

The output from the text attention layer and the output from the image attention layer are located in a joint embedding space (i.e., the text attention output and the image attention output are located in a common embedding space). Details with regard to performing cross-attention on the text embedding and performing cross-attention on the image embedding are described below in FIG. 10.

In some embodiments, the image generation model combines the text attention output and the image attention output to obtain a combined attention output, where the synthesized image is generated based on the combined attention output. The image attention output is weighted higher than the text attention output in the generator network.

At operation 725, the system generates, using a generator network of the image generation model, a synthesized image based on the text attention output and the image attention output. In some cases, the operations of this step refer to, or may be performed by, an image generation model as described with reference to FIGS. 8-10. For example, the generator network includes a diffusion model that takes a noise input and performs a diffusion process on the noise input.

In FIGS. 1-7, a method, apparatus, and non-transitory computer readable medium for image generation are described. One or more embodiments of the method, apparatus, and non-transitory computer readable medium include encoding a text prompt to obtain a text embedding; encoding an image prompt to obtain an image embedding; performing, using a text attention layer of an image generation model, cross-attention on the text embedding to obtain a text attention output; performing, using an image attention layer of the image generation model, cross-attention on the image embedding to obtain an image attention output; and generating, using a generator network of the image generation model, a synthesized image based on the text attention output and the image attention output.

Some examples of the method, apparatus, and non-transitory computer readable medium further include encoding, using an image encoder, the image prompt to obtain a preliminary image encoding. Some examples further include projecting, using an image projector, the preliminary image encoding to obtain the image embedding.

In some examples, the text embedding comprises a first plurality of tokens in a text embedding space and the image embedding comprises a second plurality of tokens in the text embedding space. In some examples, the text embedding comprises a same number of tokens as the image embedding.

Some examples of the method, apparatus, and non-transitory computer readable medium further include combining the text attention output and the image attention output to obtain a combined attention output, wherein the synthesized image is generated based on the combined attention output. In some examples, the image attention output is weighted higher than the text attention output in the generator network.

Some examples of the method, apparatus, and non-transitory computer readable medium further include performing a diffusion process on a noise input. Some examples of the method, apparatus, and non-transitory computer readable medium further include encoding the noise input to obtain an input encoding, wherein the text attention output and the image attention output are based on the input encoding.

Network Architecture

Figure 8:
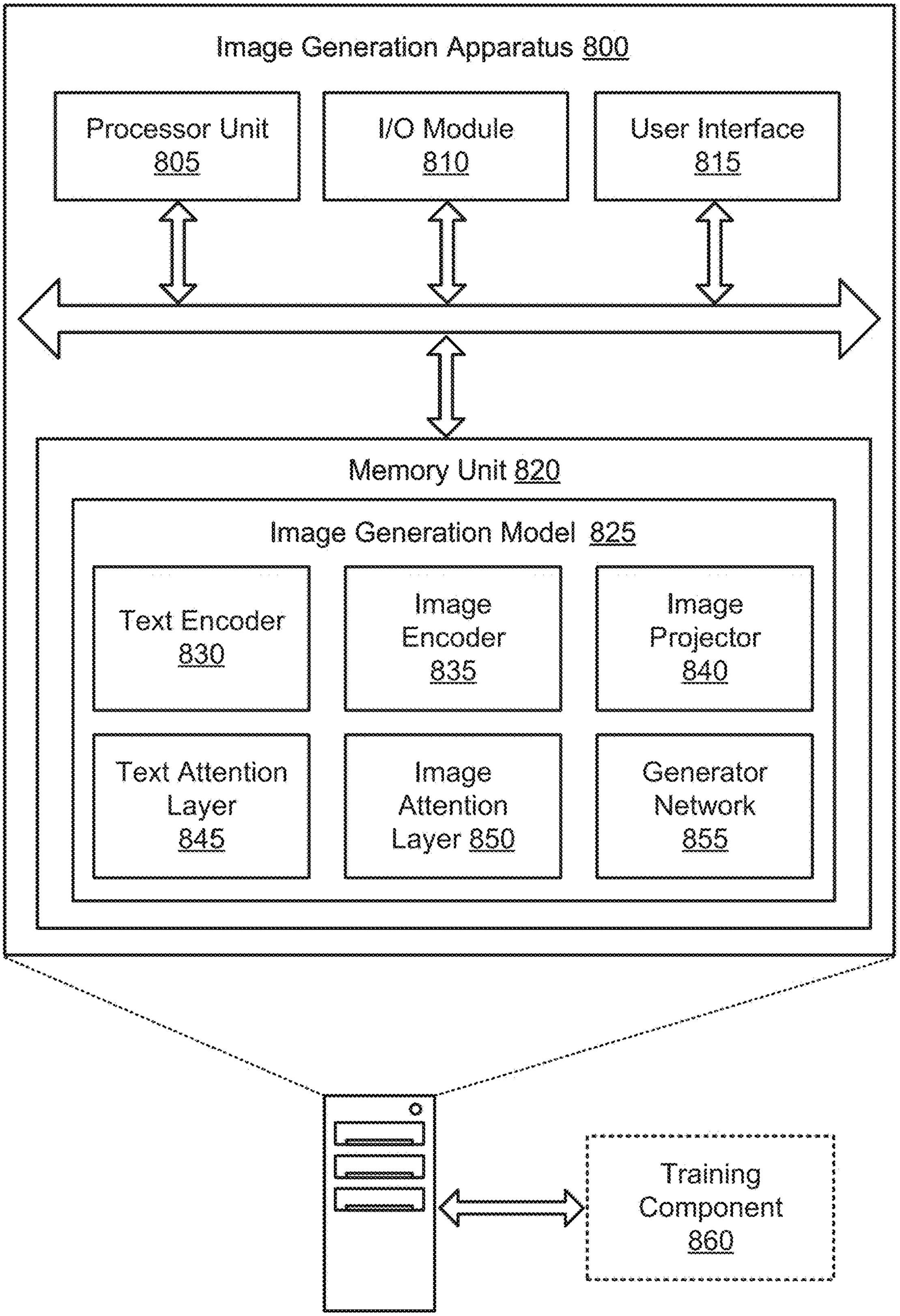
FIG. 8 shows an example of an image generation apparatus according to aspects of the present disclosure.

FIG. 8 shows an example of an image generation apparatus 800 according to aspects of the present disclosure. The example shown includes image generation apparatus 800, processor unit 805, I/O module 810, user interface 815, memory unit 820, image generation model 825, and training component 860. Image generation apparatus 800 is an example of, or includes aspects of, the corresponding element described with reference to FIG. 1.

Processor unit 805 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 805 is configured to operate a memory array using a memory controller. In other cases, a memory controller is integrated into the processor. In some cases, processor unit 805 is configured to execute computer-readable instructions stored in a memory to perform various functions. In some embodiments, processor unit 805 includes special purpose components for modem processing, baseband processing, digital signal processing, or transmission processing.

Examples of memory unit 820 include random access memory (RAM), read-only memory (ROM), or a hard disk. Examples of memory unit 820 include solid state memory and a hard disk drive. In some examples, memory unit 820 is used to store computer-readable, computer-executable software including instructions that, when executed, cause a processor to perform various functions described herein. In some cases, memory unit 820 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 820 store information in the form of a logical state.

In some examples, at least one memory unit 820 includes instructions executable by the at least one processor unit 805. Memory unit 820 includes image generation model 825 or stores parameters of image generation model 825.

I/O module 810 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 810 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image generation apparatus 800 includes a computer implemented artificial neural network (ANN) for text editing and image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of the image generation model 825 are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image generation apparatus 800 includes a convolutional neural network (CNN) for image generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In one embodiment, image generation model 825 includes text encoder 830, image encoder 835, image projector 840, text attention layer 845, image attention layer 850, and generator network 855.

According to some embodiments, text encoder 830 encodes a text prompt to obtain a text embedding. In some examples, the text encoder 830 includes a transformer architecture.

According to some embodiments, text encoder 830 encodes the training text prompt to obtain a text embedding. Text encoder 830 is an example of, or includes aspects of, the corresponding element described with reference to FIG. 9.

According to some embodiments, image encoder 835 encodes an image prompt to obtain an image embedding. In some examples, image encoder 835 encodes the image prompt to obtain a preliminary image encoding.

According to some embodiments, image encoder 835 encodes the training image prompt to obtain an image embedding, where the image generation model 825 is trained to generate the synthesized image based on the text embedding and the image embedding. Image encoder 835 is an example of, or includes aspects of, the corresponding element described with reference to FIG. 9.

According to some embodiments, image generation model 825 performs, using a text attention layer 845 of the image generation model 825, cross-attention on the text embedding to obtain a text attention output. In some examples, image generation model 825 performs, using an image attention layer 850 of the image generation model 825, cross-attention on the image embedding to obtain an image attention output. Image generation model 825 generates, using a generator network 855 of the image generation model 825, a synthesized image based on the text attention output and the image attention output.

In some examples, the text embedding includes a first set of tokens in a text embedding space and the image embedding includes a second set of tokens in the text embedding space. In some aspects, the text embedding includes a same number of tokens as the image embedding. In some examples, image generation model 825 combines the text attention output and the image attention output to obtain a combined attention output, where the synthesized image is generated based on the combined attention output. In some examples, the image attention output is weighted higher than the text attention output in the generator network 855. In some examples, image generation model 825 performs a diffusion process on a noise input. In some examples, image generation model 825 encodes the noise input to obtain an input encoding, where the text attention output and the image attention output are based on the input encoding.

According to some embodiments, parameters of image generation model 825 are stored in at least one memory (e.g., memory unit 820), where the image generation model 825 includes a text attention layer 845 that performs cross-attention based on a text prompt and an image attention layer 850 that performs cross-attention based on an image prompt. Image generation model 825 is trained to generate a synthesized image. In some examples, the image generation model 825 includes a diffusion model. In some examples, the image generation model 825 includes a U-Net architecture. Image generation model 825 is an example of, or includes aspects of, the corresponding element described with reference to FIGS. 9 and 10. Text attention layer 845 is an example of, or includes aspects of, the corresponding element described with reference to FIG. 10. Image attention layer 850 is an example of, or includes aspects of, the corresponding element described with reference to FIG. 10.

According to some embodiments, image projector 840 projects a preliminary image encoding to obtain the image embedding, where the image generation model 825 is trained to generate the synthesized image based on the image embedding. Image projector 840 is an example of, or includes aspects of, the corresponding element described with reference to FIG. 9.

According to some embodiments, training component 860 initializes an image generation model 825. In some examples, training component 860 obtains a training set including a training text prompt and a training image prompt. Training component 860 trains, using the training set, the image generation model 825 to generate a synthesized image, where the image generation model 825 includes a text attention layer 845 that performs cross-attention based on the training text prompt and an image attention layer 850 that performs cross-attention based on the training image prompt.

In some examples, training component 860 computes a diffusion loss. Training component 860 updates parameters of the image generation model 825 based on the diffusion loss. In some examples, training component 860 generates the training text prompt based on the training image prompt. In some cases, training component 860 (shown in dashed line) is implemented on an apparatus other than image generation apparatus 800.

FIG. 9 shows an example of an image generation model 900 according to aspects of the present disclosure. The example shown includes image generation model 900, text prompt 905, image prompt 910, text encoder 915, image encoder 920, preliminary image encoding 925, image projector 930, image embedding 935, and text embedding 940. Image generation model 900 is an example of, or includes aspects of, the corresponding element described with reference to FIGS. 8 and 10. One or more embodiments relate to modality specific learnable attention for improved multi-conditioned diffusion model.

Text-to-image generation models are trained with text embedding though image embeddings are generally more informative. Image generation model 900 uses text embedding 940 and image embedding 935. To improve multi-modal conditioning ability of the model and to improve controllability and capacity of the model, embodiments of the present disclosure provide a separate learnable way to encode text and image that the model attends to equally and independently and then compose the output information.

In some embodiments, a text prompt 905 and an image prompt 910 are processed separately. For example, text prompt 905 is "an astronaut riding a camel", which is fed to text encoder 915. Text encoder 915 encodes text prompt 905 to obtain text embedding 940. For example, text embedding 940 has a dimension of 128×1024. In some cases, a text projector (optional) takes an encoding from text encoder 915 and converts the encoding to obtain text embedding 940. The encoding from text encoder 915 has a dimension of 128×4096. The image prompt 910 is passed to corresponding learnable projection layers (e.g., image projector 930). The machine learning model attends to text and image and then the union of what the model learns is used for next step(s). Due to such configurations, more weight is provided for image during training (e.g., 30%) without image dominating.

While separating the cross-attention path helps with better learning and quality, the image embedding 935 is one flattened embedding. To improve capacity of image-based learning, image generation model 900 is configured to project the input image embedding to 8 tokens and then use these tokens in the separate cross-attention pathway.

In some embodiments, image encoder 920 separately encodes image prompt 910 to obtain preliminary image encoding 925. For example, preliminary image encoding 925 has a dimension of 1×1024. Preliminary image encoding 925 is projected to 8 tokens using a learnable image projector 930. The output from image projector 930 has a dimension of 8×1024. Separate learnable cross-attention layers for text and image are applied onto the embeddings separately in parallel. Image generation model 900 generates cross-attention output on text and image. The cross-attention outputs for text and image are then combined together. Detail regarding the process of using cross-attention for text and image is described in FIG. 10.

In some examples, the text embedding 940 comprises a first set of tokens in a text embedding space and the image embedding 935 comprises a second set of tokens in the text embedding space. In some examples, the text embedding 940 comprises a same number of tokens as the image embedding 935. Image embedding 935 is an example of, or includes aspects of, the corresponding element described with reference to FIG. 10. Text embedding 940 is an example of, or includes aspects of, the corresponding element described with reference to FIG. 10.

In some embodiments, text encoder 915 and image encoder 920 are fixed models, i.e., parameters are frozen during training. Image projector 930 is a learnable model trained together with diffusion model 1045 (with reference to FIG. 10). Text prompt 905 is an example of, or includes aspects of, the corresponding element described with reference to FIGS. 5 and 6. Image prompt 910 is an example of, or includes aspects of, the corresponding element described with reference to FIGS. 5 and 6. Text encoder 915 is an example of, or includes aspects of, the corresponding element described with reference to FIG. 8. Image encoder 920 is an example of, or includes aspects of, the corresponding element described with reference to FIG. 8. Image projector 930 is an example of, or includes aspects of, the corresponding element described with reference to FIG. 8.

FIG. 10 shows an example of an image generation model 1000 according to aspects of the present disclosure. The example shown includes image generation model 1000, noise input 1005, text embedding 1010, image embedding 1015, noise encoder 1020, text attention layer 1025, image attention layer 1030, text attention output 1035, image attention output 1040, diffusion model 1045, output latent 1050, latent-to-pixel decoder 1055, and synthesized image 1060. Image generation model 1000 is an example of, or includes aspects of, the corresponding element described with reference to FIGS. 8 and 9. In some cases, text embedding 1010 and image embedding 1015 correspond to text embedding 940 and image embedding 935, in FIG. 9, respectively.

In an embodiment, noise encoder 1020 is configured to encode noise input 1005 to obtain an input encoding (the input encoding is also referred to as an intermediate feature map), where text attention output 1035 and image attention output 1040 are based on the input encoding. The noise encoder 1020 may be viewed as part of the diffusion model 1045. At each layer l of diffusion model 1045, noise encoder 1020 generates an intermediate feature map that is then fed to attention modules. The intermediate feature map serves as a query to text attention layer 1025. A corresponding key and a corresponding value are input to text attention layer 1025. The same intermediate feature map serves as a query to image attention layer 1030. A corresponding key and a corresponding value are input to image attention layer 1030. The key and value projections are different from different layers. The query is different for different layers. Image generation model 1000 performs, using a text attention layer 1025, cross-attention on the text embedding 1010 to obtain text attention output 1035. Image generation model 1000 performs, using an image attention layer 1030, cross-attention on the image embedding 1015 to obtain an image attention output 1040. The output from text attention layer 1025 and the output from image attention layer 1030 are located in a joint embedding space (i.e., text attention output 1035 and image attention output 1040 are located in a common embedding space).

In an embodiment, image generation model 1000 combines the text attention output 1035 and the image attention output 1040 to obtain a combined attention output, where the synthesized image 1060 is generated based on the combined attention output. The combined attention output is fed to diffusion model 1045 for image generation.

In some embodiments, an attention layer (or an attention module) is implemented separately for text modality and image modality. In some examples, key and value projections are configured and implemented separately for text modality and image modality. Text attention layer 1025 and image attention layer 1030 are trained independently.

In an embodiment, a generator network such as diffusion model 1045 takes noise input 1005 as input. Diffusion model 1045 performs a diffusion process on noise input 1005 to generate output latent 1050. Output latent 1050 is fed to latent-to-pixel decoder 1055, which generates synthesized image 1060. Synthesized image 1060 is also referred to as an output image. In some cases, the image attention output 1040 is weighted higher than the text attention output 1035 in the generator network.

Separate learnable cross-attention layers for text and image (text attention layer 1025 and image attention layer 1030) are applied onto the text and image embeddings separately in parallel. Image generation model 1000 generates cross-attention output on text and image. The cross-attention outputs for text and image are then combined together. In an embodiment, the text attention layer 1025, image attention layer 1030, and diffusion model 1045 are jointly trained end-to-end during training time. Latent-to-pixel decoder 1055 is frozen, e.g., parameters of the latent-to-pixel decoder 1055 are not updated during training.

Image generation model 1000 generates increased image variations because of increased image probability shown during training. Additionally, text-to-image results are improved even though text is shown less because of information from image embedding. Furthermore, image generation model 1000 generates default "composition" where giving text and image both generates unseen compositions.

Image generation model 1000 ensures that concentrating on image embedding does not mean attention has to be less on some text token. Also, image generation model 1000 makes it relatively easy to "drop" something by simply making the resultant attended feature map 0s (no signal for aggregation) compared to "empty" string or all zero embeddings. A path/modality can be switched off.

In some examples, image generation model 1000 is enabled to support composition and better controllability during inference. Addition of image embedding with higher probability during training improves model's capacity, overall quality, diversity and compositionality.

Text embedding 1010 is an example of, or includes aspects of, the corresponding element described with reference to FIG. 9. Image embedding 1015 is an example of, or includes aspects of, the corresponding element described with reference to FIG. 9.

Text attention layer 1025 is an example of, or includes aspects of, the corresponding element described with reference to FIG. 8. Image attention layer 1030 is an example of, or includes aspects of, the corresponding element described with reference to FIG. 8.

Figure 11:
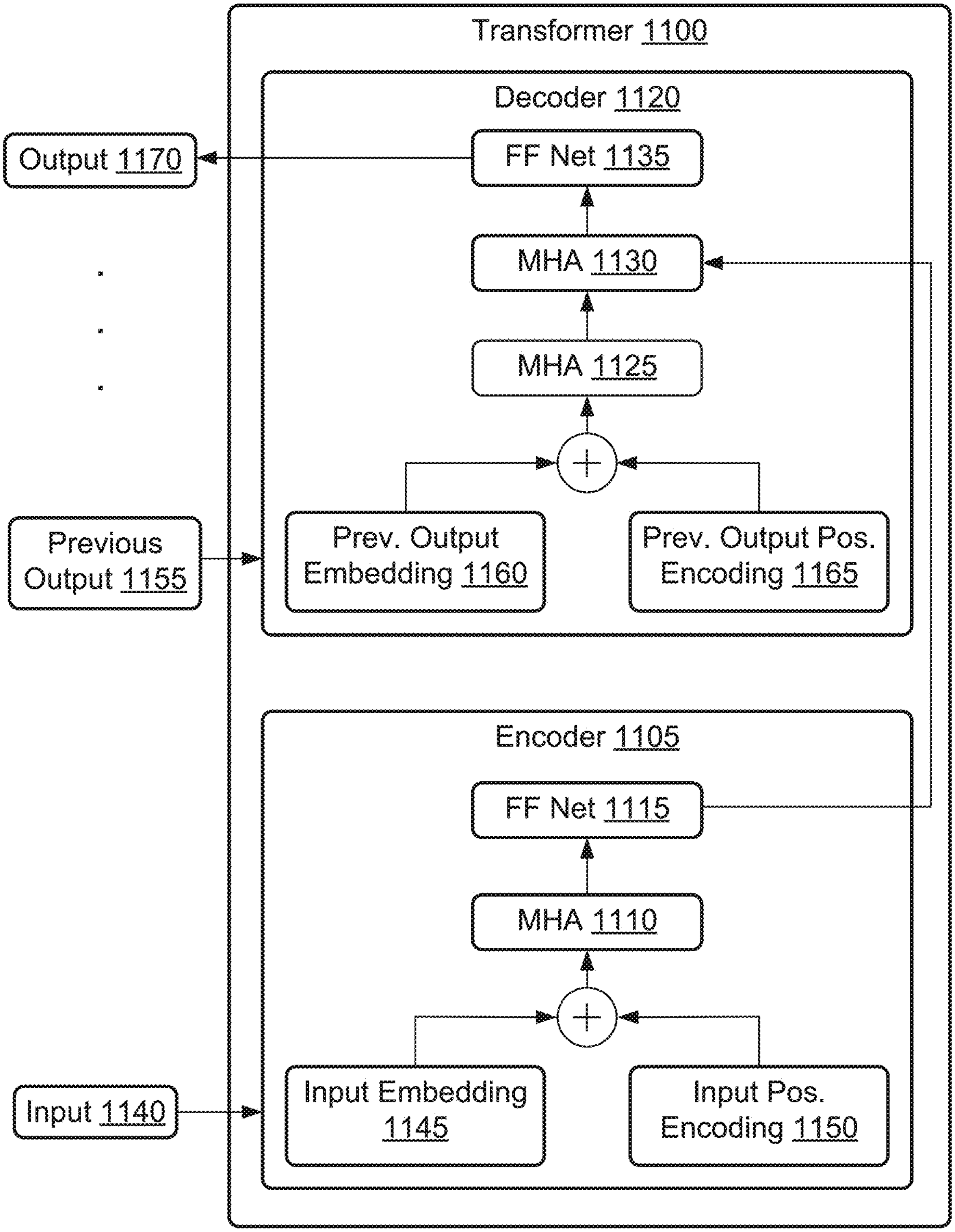
FIG. 11 shows an example of a transformer network according to aspects of the present disclosure.

FIG. 11 shows an example of a transformer network according to aspects of the present disclosure. The example shown includes transformer 1100, encoder 1105, decoder 1120, input 1140, input embedding 1145, input positional encoding 1150, previous output 1155, previous output embedding 1160, previous output positional encoding 1165, and output 1170.

In some cases, encoder 1105 includes multi-head self-attention sublayer 1110 and feed-forward network sublayer 1115. In some cases, decoder 1120 includes first multi-head self-attention sublayer 1125, second multi-head self-attention sublayer 1130, and feed-forward network sublayer 1135.

According to some aspects, a machine learning model (such as the image generation model described with reference to FIGS. 8-10) comprises transformer 1100. In some cases, encoder 1105 is configured to map input 1140 (for example, a query or a prompt comprising a sequence of words or tokens) to a sequence of continuous representations that are fed into decoder 1120. In some cases, decoder 1120 generates output 1170 (e.g., a prediction of an output sequence of words or tokens) based on the output of encoder 1105 and previous output 1155 (e.g., a previously predicted output sequence), which allows for the use of autoregression.

For example, in some cases, encoder 1105 parses input 1140 into tokens and vectorizes the parsed tokens to obtain input embedding 1145, and adds input positional encoding 1150 (e.g., positional encoding vectors for input 1140 of a same dimension as input embedding 1145) to input embedding 1145. In some cases, input positional encoding 1150 includes information about relative positions of words or tokens in input 1140.

In some cases, encoder 1105 comprises one or more encoding layers (e.g., six encoding layers) that generate contextualized token representations, where each representation corresponds to a token that combines information from other input tokens via self-attention mechanism. In some cases, each encoding layer of encoder 1105 comprises a multi-head self-attention sublayer (e.g., multi-head self-attention sublayer 1110). In some cases, the multi-head self-attention sublayer implements a multi-head self-attention mechanism that receives different linearly projected versions of queries, keys, and values to produce outputs in parallel. In some cases, each encoding layer of encoder 1105 also includes a fully connected feed-forward network sublayer (e.g., feed-forward network sublayer 1115) comprising two linear transformations surrounding a Rectified Linear Unit (ReLU) activation:

$$FFN(x) = ReLU(W_1x + b_1)W_2 + b_2 \tag{1}$$

In some cases, each layer employs different weight parameters ($W_1$, $W_2$) and different bias parameters ($b_1$, $b_2$) to apply a same linear transformation each word or token in input 1140.

In some cases, each sublayer of encoder 1105 is followed by a normalization layer that normalizes a sum computed between a sublayer input x and an output sublayer (x) generated by the sublayer:

$$layernorm(x+\text{sublayer}(x)) \tag{2}$$

In some cases, encoder 1105 is bidirectional because encoder 1105 attends to each word or token in input 1140 regardless of a position of the word or token in input 1140.

In some cases, decoder 1120 comprises one or more decoding layers (e.g., six decoding layers). In some cases, each decoding layer comprises three sublayers including a first multi-head self-attention sublayer (e.g., first multi-head self-attention sublayer 1125), a second multi-head self-attention sublayer (e.g., second multi-head self-attention sublayer 1130), and a feed-forward network sublayer (e.g., feed-forward network sublayer 1135). In some cases, each sublayer of decoder 1120 is followed by a normalization layer that normalizes a sum computed between a sublayer input x and an output sublayer (x) generated by the sublayer.

In some cases, decoder 1120 generates previous output embedding 1160 of previous output 1155 and adds previous output positional encoding 1165 (e.g., position information for words or tokens in previous output 1155) to previous output embedding 1160. In some cases, each first multi-head self-attention sublayer receives the combination of previous output embedding 1160 and previous output positional encoding 1165 and applies a multi-head self-attention mechanism to the combination. In some cases, for each word in an input sequence, each first multi-head self-attention sublayer of decoder 1120 attends only to words preceding the word in the sequence, and so transformer 1100's prediction for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 1105 by receiving a query Q from a previous sublayer of decoder 1120 and a key K and a value V from the output of encoder 1105, allowing decoder 1120 to attend to each word in the input 1140.

In some cases, each feed-forward network sublayer implements a fully connected feed-forward network similar to feed-forward network sublayer 1115. In some cases, the feed-forward network sublayers are followed by a linear transformation and a softmax to generate a prediction of output 1170 (e.g., a prediction of a next word or token in a sequence of words or tokens). Accordingly, in some cases, transformer 1100 generates a response as described herein based on a predicted sequence of words or tokens.

Figure 12:
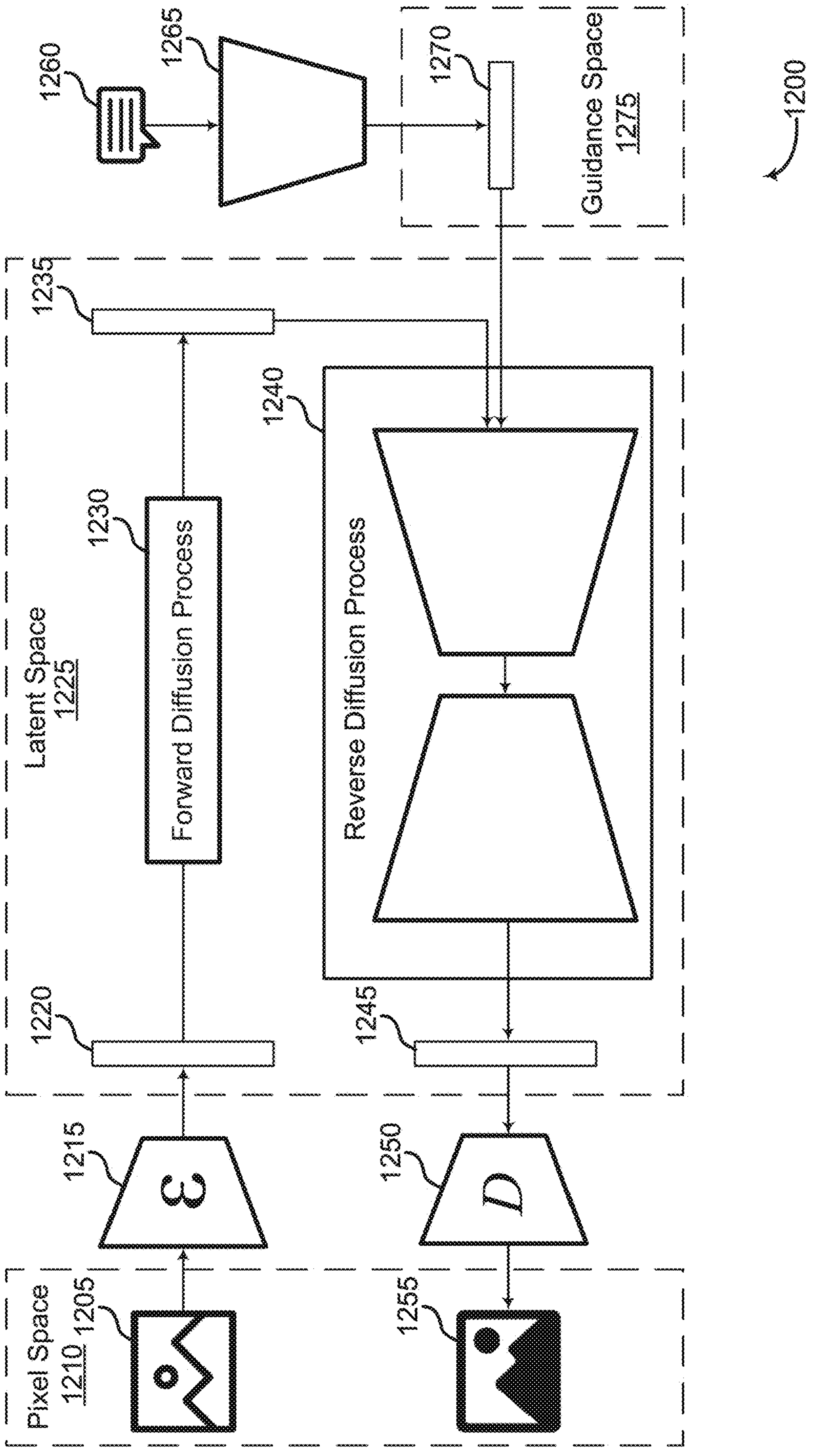
FIG. 12 shows an example of a guided latent diffusion model according to aspects of the present disclosure.

FIG. 12 shows an example of a guided latent diffusion model 1200 according to aspects of the present disclosure. The guided latent diffusion model 1200 depicted in FIG. 12 is an example of, or includes aspects of, the corresponding element described with reference to FIG. 8 (e.g., generator network 855).

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 1200 may take an original image 1205 in a pixel space 1210 as input and apply and image encoder 1215 to convert original image 1205 into original image features 1220 in a latent space 1225. Then, a forward diffusion process 1230 gradually adds noise to the original image features 1220 to obtain noisy features 1235 (also in latent space 1225) at various noise levels.

Next, a reverse diffusion process 1240 (e.g., a U-Net ANN) gradually removes the noise from the noisy features 1235 at the various noise levels to obtain denoised image features 1245 in latent space 1225. In some examples, the denoised image features 1245 are compared to the original image features 1220 at each of the various noise levels, and parameters of the reverse diffusion process 1240 of the diffusion model are updated based on the comparison. Finally, an image decoder 1250 decodes the denoised image features 1245 to obtain an output image 1255 in pixel space 1210. In some cases, an output image 1255 is created at each of the various noise levels. The output image 1255 can be compared to the original image 1205 to train the reverse diffusion process 1240.

In some cases, image encoder 1215 and image decoder 1250 are pre-trained prior to training the reverse diffusion process 1240. In some examples, they are trained jointly, or the image encoder 1215 and image decoder 1250 and fine-tuned jointly with the reverse diffusion process 1240.

The reverse diffusion process 1240 can also be guided based on a text prompt 1260, or another guidance prompt, such as an image, a layout, a segmentation map, etc. The text prompt 1260 can be encoded using a text encoder 1265 (e.g., a multimodal encoder) to obtain guidance features 1270 in guidance space 1275. The guidance features 1270 can be combined with the noisy features 1235 at one or more layers of the reverse diffusion process 1240 to ensure that the output image 1255 includes content described by the text prompt 1260. For example, guidance features 1270 can be combined with the noisy features 1235 using a cross-attention block within the reverse diffusion process 1240.

In FIGS. 8-12, an apparatus and method for image generation are described. One or more embodiments of the apparatus and method include at least one processor; at least one memory including instructions executable by the at least one processor; and an image generation model comprising parameters in the at least one memory, wherein the image generation model includes a text attention layer that performs cross-attention based on a text prompt and an image attention layer that performs cross-attention based on an image prompt, and wherein the image generation model is trained to generate a synthesized image.

Some examples of the apparatus and method further include a text encoder configured to encode the text prompt to obtain a text embedding. In some examples, the text encoder includes a transformer architecture.

Some examples of the apparatus and method further include an image encoder configured to encode the image prompt to obtain an image embedding. Some examples of the apparatus and method further include an image projector configured to project a preliminary image encoding to obtain the image embedding. In some examples, the image generation model comprises a diffusion model. In some examples, the image generation model comprises a U-Net architecture.

Training and Evaluation

Figure 13:
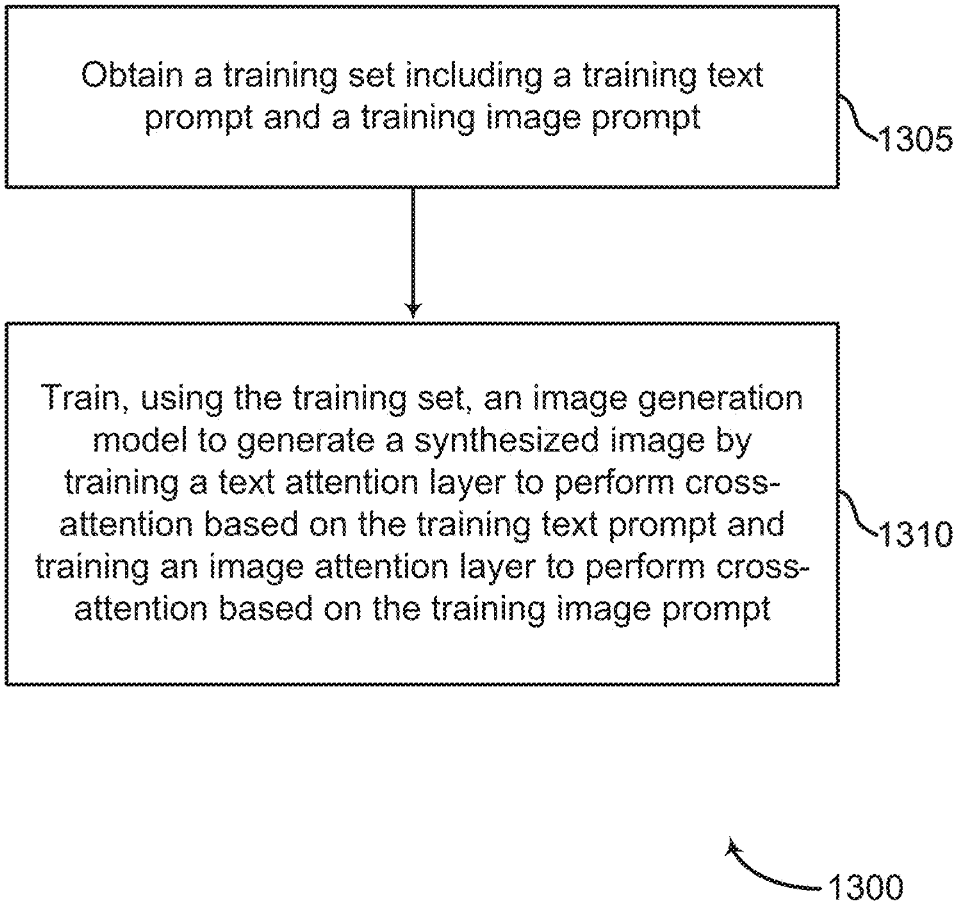
FIG. 13 shows an example of a method for training an image generation model according to aspects of the present disclosure.

FIG. 13 shows an example of a method 1300 for training an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system obtains a training set including a training text prompt and a training image prompt. In some cases, the operations of this step refer to, or may be performed by, a training component as described with reference to FIG. 8. In some cases, obtaining a training set can include creating training data for training the image generation model.

In some examples, the system initializes an image generation model and the initialization refers to, or may be performed by, a training component as described with reference to FIG. 8. In some examples, the image generation model is initialized using random values. In other examples, initial values are initialized from a pre-trained model. In other examples, values of a base model (e.g., a generator network such as a latent diffusion model) are taken from a pre-trained model and additional parameters (i.e., network components other than the generator network) are initialized randomly.

At operation 1310, the system trains, using the training set, an image generation model to generate a synthesized image by training a text attention layer to perform cross-attention based on the training text prompt and training an image attention layer to perform cross-attention based on the training image prompt. In some cases, the operations of this step refer to, or may be performed by, a training component as described with reference to FIG. 8.

For example, if the image generation model is a diffusion model, operation 1315 may include obtaining a noise input, generating a noise prediction based on the noise input, computing a diffusion loss based on the noise prediction and the ground-truth image; and updating parameters of the image generation model based on the diffusion loss.

In FIG. 13, a method, apparatus, and non-transitory computer readable medium for image generation are described. One or more embodiments of the method, apparatus, and non-transitory computer readable medium include initializing an image generation model; obtaining a training set including a training text prompt and a training image prompt; and training, using the training set, the image generation model to generate a synthesized image, wherein the image generation model includes a text attention layer that performs cross-attention based on the training text prompt and an image attention layer that performs cross-attention based on the training image prompt.

Some examples of the method, apparatus, and non-transitory computer readable medium further include computing a diffusion loss. Some examples further include updating parameters of the image generation model based on the diffusion loss.

Some examples of the method, apparatus, and non-transitory computer readable medium further include generating the training text prompt based on the training image prompt. Some examples of the method, apparatus, and non-transitory computer readable medium further include encoding the training text prompt to obtain a text embedding. Some examples further include encoding the training image prompt to obtain an image embedding, wherein the image generation model is trained to generate the synthesized image based on the text embedding and the image embedding.

Some examples of the method, apparatus, and non-transitory computer readable medium further include projecting, using an image projector, a preliminary image encoding to obtain the image embedding, wherein the image generation model is trained to generate the synthesized image based on the image embedding.

Figure 14:
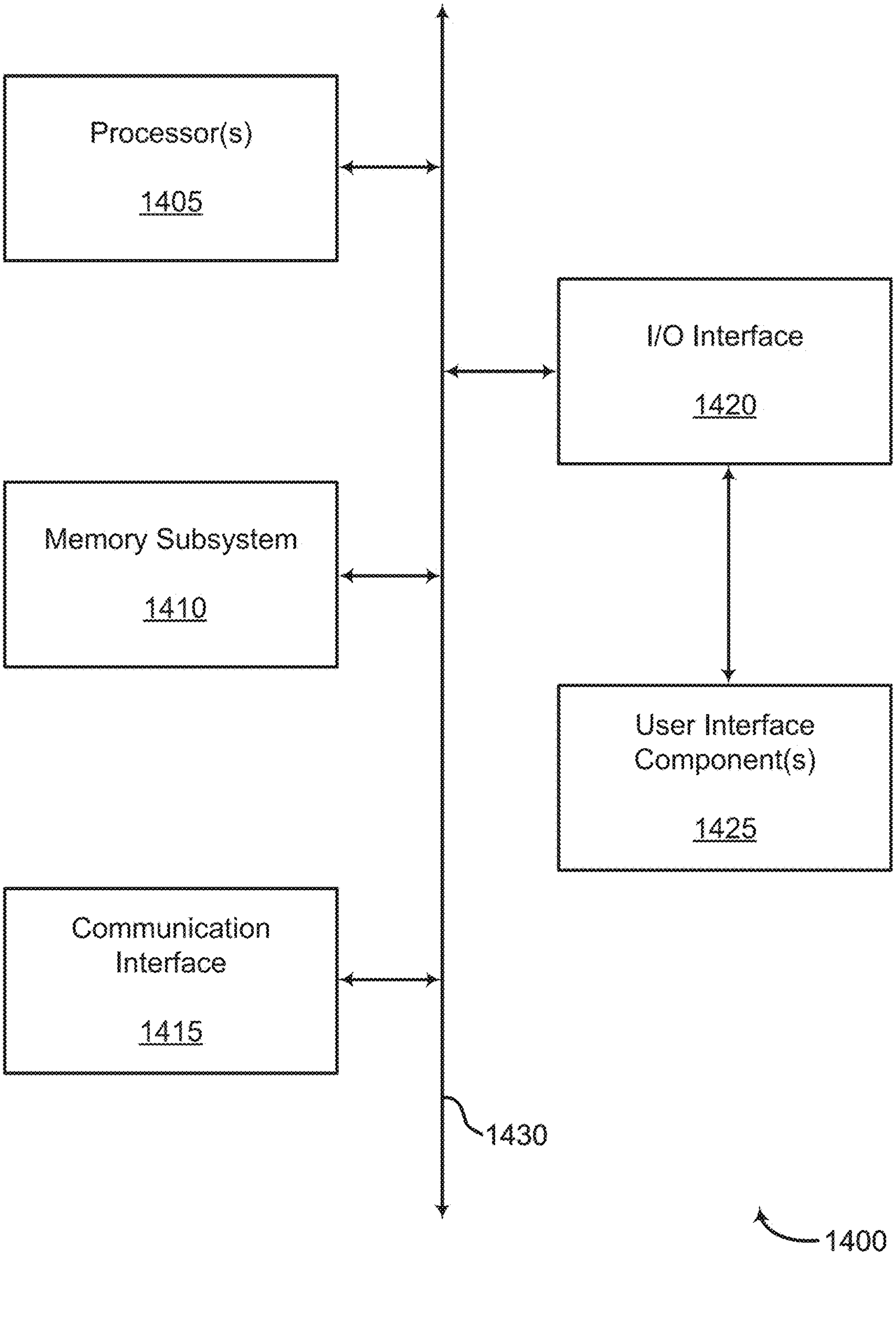
FIG. 14 shows an example of a computing device for image generation according to aspects of the present disclosure.

FIG. 14 shows an example of a computing device 1400 for image generation according to aspects of the present disclosure. The example shown includes computing device 1400, processor(s) 1405, memory subsystem 1410, communication interface 1415, I/O interface 1420, user interface component(s) 1425, and channel 1430. In one embodiment, computing device 1400 includes processor(s) 1405, memory subsystem 1410, communication interface 1415, I/O interface 1420, user interface component(s) 1425, and channel 1430.

In some embodiments, computing device 1400 is an example of, or includes aspects of, image generation apparatus 110 of FIG. 1. In some embodiments, computing device 1400 includes one or more processors 1405 that can execute instructions stored in memory subsystem 1410 to encode a text prompt to obtain a text embedding; encode an image prompt to obtain an image embedding; perform, using a text attention layer of an image generation model, cross-attention on the text embedding to obtain a text attention output; perform, using an image attention layer of the image generation model, cross-attention on the image embedding to obtain an image attention output; and generate, using a generator network of the image generation model, a synthesized image based on the text attention output and the image attention output.

According to some embodiments, computing device 1400 includes one or more processors 1405. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some embodiments, user interface component(s) 1425 enable a user to interact with computing device 1400. In some cases, user interface component(s) 1425 include an audio device, such as an external speaker system, an external display device such as a display screen, an input device (e.g., a remote control device interfaced with a user interface directly or through the I/O controller), or a combination thereof. In some cases, user interface component(s) 1425 include a GUI.

Performance of apparatus, systems and methods of the present disclosure have been evaluated, and results indicate embodiments of the present disclosure have obtained increased performance over existing technology. Example experiments demonstrate that the image generation apparatus described in embodiments of the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a text prompt, an image prompt, and a noise input;

encoding the text prompt to obtain a text embedding;

encoding the image prompt to obtain an image embedding;

generating, using an image generation model, an intermediate feature map based on the noise input;

performing, using a text attention layer of the image generation model, cross-attention on the text embedding and the intermediate feature map to obtain a text attention output;

performing, using an image attention layer of the image generation model, cross-attention on the image embedding and the same intermediate feature map provided to the text attention layer to obtain an image attention output; and generating, using a generator network of the image generation model, a synthesized image based on the text attention output and the image attention output.

2. The method of claim 1, wherein encoding the image prompt comprises:

encoding, using an image encoder, the image prompt to obtain a preliminary image encoding; and projecting, using an image projector, the preliminary image encoding to obtain the image embedding.

3. The method of claim 1, wherein:

the text embedding comprises a first plurality of tokens in a text embedding space and the image embedding comprises a second plurality of tokens in the text embedding space.

4. The method of claim 1, wherein:

the text embedding comprises a same number of tokens as the image embedding.

5. The method of claim 1, further comprising:

combining the text attention output and the image attention output to obtain a combined attention output, wherein the synthesized image is generated based on the combined attention output.

6. The method of claim 1, wherein generating the synthesized image comprises:

performing a diffusion process on the noise input.

7. The method of claim 1, wherein:

the text attention output and the image attention output are located in a common embedding space.

8. A method of training a machine learning model, the method comprising:

obtaining a training set including a training text prompt, a training image prompt, and a noise input; and training, using the training set, an image generation model to generate a synthesized image, the training comprising:

encoding the training text prompt to obtain a text embedding;

encoding the training image prompt to obtain an image embedding;

generating, using the image generation model, an intermediate feature map based on the noise input;

training a text attention layer of the image generation model to perform cross-attention on the text embedding and the intermediate feature map to obtain a text attention output; and training an image attention layer of the image generation model to perform cross-attention on the embedding and the same intermediate feature map provided to the text attention layer to obtain an image attention output.

9. The method of claim 8, wherein the training the image generation model comprises:

computing a diffusion loss; and updating parameters of the image generation model based on the diffusion loss.

10. The method of claim 8, wherein obtaining the training set comprises:

generating the training text prompt based on the training image prompt.

11. The method of claim 8, wherein the image generation model is trained to generate the synthesized image based on the text embedding and the image embedding.

12. The method of claim 11, further comprising:

projecting, using an image projector, a preliminary image encoding to obtain the image embedding, wherein the image generation model is trained to generate the synthesized image based on the image embedding.

13. The method of claim 12, wherein:

the image projector is jointly trained with the image generation model.

14. An apparatus comprising:

at least one processor; and at least one memory including instructions executable by the at least one processor to perform operations comprising:

obtaining a text prompt, an image prompt, and a noise input;

encoding the text prompt to obtain a text embedding;

encoding the image prompt to obtain an image embedding;

generating, using an image generation model, an intermediate feature map based on the noise input;

performing, using a text attention layer of the image generation model, cross-attention on the text embedding and the intermediate feature map to obtain a text attention output;

performing, using an image attention layer of the image generation model, cross-attention on the image embedding and the same intermediate feature map provided to the text attention layer to obtain an image attention output; and generating, using a generator network of the image generation model, a synthesized image based on the text attention output and the image attention output.

15. The apparatus of claim 14, further comprising:

a text encoder configured to encode the text prompt to obtain the text embedding.

16. The apparatus of claim 15, wherein:

the text encoder includes a transformer architecture.

17. The apparatus of claim 14, further comprising:

an image encoder configured to encode the image prompt to obtain the image embedding.

18. The apparatus of claim 17, further comprising:

an image projector configured to project a preliminary image encoding to obtain the image embedding.

19. The apparatus of claim 14, wherein:

the image generation model comprises a diffusion model.

* * * * *